Patented Oct. 5, 1954

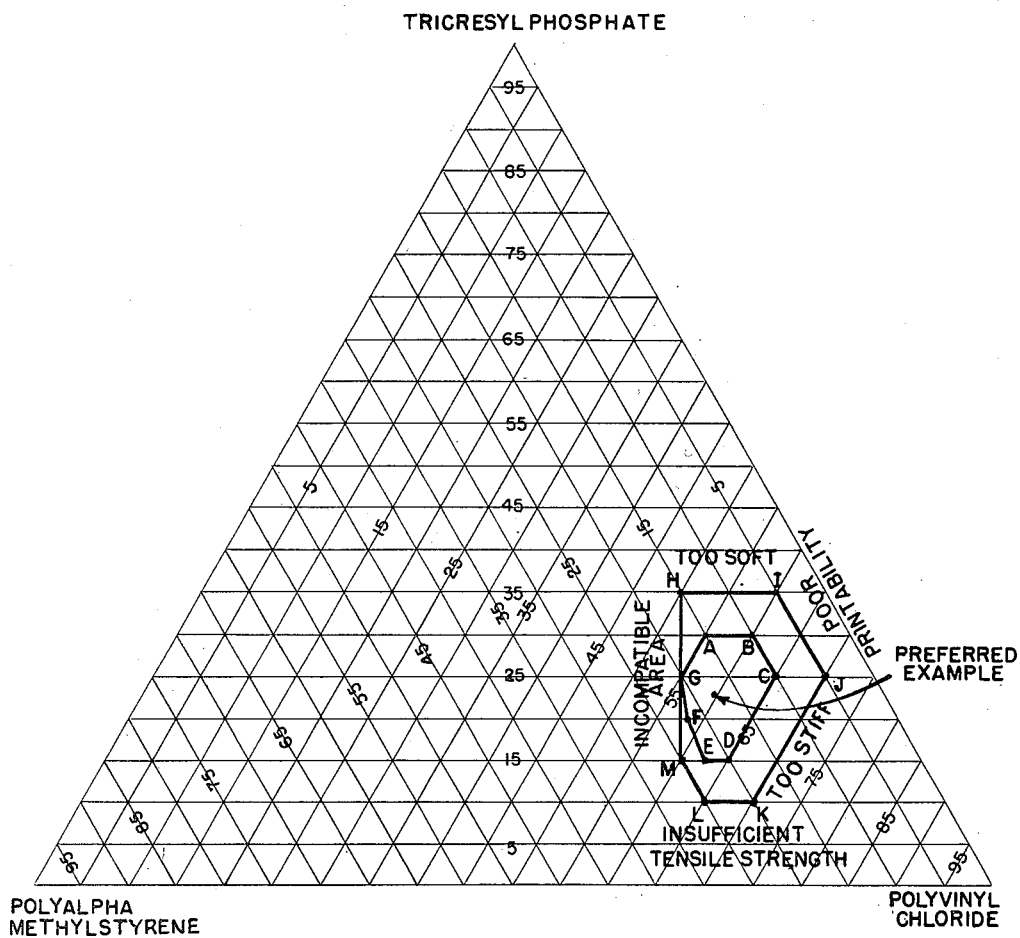

2,690,981

UNITED STATES PATENT OFFICE 2,690,981

PLASTICIZED POLYVINYL CHLORIDE COMPOSITIONS

Henry Clarke Funk and Marquis Brentwood Reger, Newburgh, N. Y., assignors to E. I. du Pont de Nemours & Company, Wilmington, Del., a corporation of Delaware Application March 15, 1952, Serial No. 276,820

8 Claims. (Cl. 117—76)

This invention relates to plasticized polyvinyl chloride resin compositions and, more particularly, to polyvinyl chloride resin coated fabrics adapted for use in the bookbinding art.

Polyvinyl chloride resin has replaced cellulose derivatives, such as, e. g. cellulose nitrate, ethyl cellulose, cellulose acetate, etc., for a great many uses, particularly fabric coatings. The polyvinyl chloride resin coatings are usually preferred over the cellulose derivatives for coatings on fabrics where toughness, abrasion resistance and long flex life are desired. The properties of polyvinyl chloride coated fabrics and unsupported films make them particularly desirable in the binding of text books, reference books and catalogues, or any book which is subject to considerable use over a long period of time.

The commercial printing inks employed in the printing of books which are based on drying-oils, which dry by oxidation, will not adhere to the conventionally plasticized polyvinyl chloride surfaces and for this reason the polyvinyl chloride coated fabrics and unsupported films have not as yet been adopted widely as a bookbinding material, particularly in those cases where the book cover is printed on the surface.

Cellulose nitrate coated fabrics have been used widely for binding books and a great many books with such bindings are now on library shelves. When a book bound with a conventionally plasticized polyvinyl chloride coated fabric or film is placed on a shelf in pressure contact with a book bound with a cellulose nitrate coated fabric, the plasticizer will migrate from the polyvinyl chloride to the cellulose nitrate coating and exert a solvent action on the cellulose nitrate and mar the surfaces of the books. This plasticizer migration is also a source of trouble when conventionally plasticized polyvinyl chloride coatings and films are placed in prolonged contact with various furniture finishes.

The primary object of this invention is to provide a flexible polyvinyl chloride composition to which commercial printing inks, which dry by oxidation, will adhere. A further object is to provide a flexible polyvinyl chloride composition which will not mar certain types of finishes when in pressure contact therewith over a prolonged period. A still further object is the provision of flexible polyvinyl chloride coated fabric having other desirable bookbinding properties, such as, e. g., adherence to gold leaf and blanking. "Blanking" is a term used in the bookbinding industry to describe an operation which flattens a small area of an already embossed surface to provide a smooth area for printing.

The objects of this invention are accomplished by providing a unique plasticizer blend for the polyvinyl chloride comprising tricresyl phosphate and polyalpha methylstyrene. In a modification to accomplish still further improvements in flex durability, surface gloss, and resistance to marring cellulose derivative coatings and finishes, an aryl sulfonamide-formaldehyde resin is also incorporated with the tricresyl phosphate/polyalpha methylstyrene plasticized polyvinyl chloride.

In the drawing, the single figure is a triangular graph showing the operative and preferred ranges based on the combined weights of the three essential ingredients. The area delineated by points ABCDEFG shows the preferred range. The points HIJKLM delineate the operative or useful range.

The following specific examples are given by way of illustration and not of limitation.

EXAMPLE I

A cotton sheeting fabric running 3.35 yards per pound per 43" width was coated on one side with one coat of the following base coating composition:

|  | Wet Basis, Percent by Weight | Dry Basis, Percent by Weight |
|---|---|---|
| Polyvinyl chloride powder | 20.0 | 27.1 |
| Tricresyl phosphate | 7.7 | 10.4 |
| Polyalpha methylstyrene | 5.6 | 7.6 |
| Pigment | 38.0 | 51.3 |
| Polyvinyl acetate | 2.7 | 3.6 |
| Ethyl alcohol/ethyl acetate (1:1) | 26.0 | |
|  | 100.0 | 100.0 |

The above composition was prepared by first grinding the pigmen in a blend of the tricresyl phosphate and polyalpha methylstyrene on a three roll mill by conventional technique. The polyvinyl chloride powder was stirred into the pigment/plasticizer mixture at room temperature. The polyvinyl chloride was dispersed in the pigment/plasticizer mixture without gelatinizing or colloiding the resin. The polyvinyl acetate was separately dispersed or colloided in the ethyl alcohol/ethyl acetate mixture and then added to polyvinyl chloride/pigment/plasticizer blend and the composition thoroughly mixed at room temperature without colloiding the polyvinyl chloride.

The polyvinyl acetate solution was added to above composition to impart bridging properties to the composition and minimize the tendency for the composition to strike through the interstices of the fabric when applied by means of a doctor knife. The adding of polyvinyl acetate solution to polyvinyl chloride plastisol dispersion per se, to prevent the composition from striking through on open-weave fabric, is disclosed and claimed in a copending application S. N. 185,423, filed September 18, 1950, by Raymond E. Thomas.

Approximately 2.5 ounces per square yard of the above composition were spread on the cotton fabric by means of a doctor knife, which corresponds to approximately 2.0 ounces of non-volatile ingredients. The coated fabric was passed through a heat zone (240–320° F. air temperature) to evaporate the volatile solvent and partially set the coating.

A top coat of the following composition was superposed over the above described base coating:

|  | Wet Basis, Percent by Weight | Dry Basis, Percent by Weight |
|---|---|---|
| Polyvinyl chloride | 51.5 | 55.0 |
| Tricresyl phosphate | 19.6 | 20.9 |
| Polyalpha methylstyrene | 14.8 | 15.8 |
| Pigment | 7.7 | 8.3 |
| Ethyl alcohol/ethyl acetate (1:1) | 6.4 | |
|  | 100.0 | 100.0 |

The top coat composition was prepared in the same manner as described for the base coat composition. Approximately 1.9 ounces per square yard of the top coat composition were applied over the base coat, which corresponds to approximately 1.8 ounces per square yard of non-volatile ingredients, and the material was again passed through a heat zone (240°–320° F. air temperature) to volatilize the solvents and partially set the top coating. The coated fabric was next subjected to sufficient additional heat (325–375° F.) to colloid the polyvinyl chloride resin in the plasticizer, after which, while the coating was still hot, it was embossed by passing between cold pressure rolls, the one which contacted the coating having a design engraved on its surface.

EXAMPLE II

Another coated fabric bookbinding material was made in the same manner as described above, differing only in the presence of "Santolite MHP" (an aryl sulfonamide/formaldehyde resin) in each of the separate base and top coatings. The formulae employed for this example were as follows:

*Base coat*

|  | Wet Basis, Percent by Weight | Dry Basis, Percent by Weight |
|---|---|---|
| Polyvinyl chloride | 25.60 | 29.1 |
| Tricresyl phosphate | 10.01 | 11.5 |
| Polyalpha methylstyrene | 7.16 | 8.1 |
| Pigment | 39.63 | 45.2 |
| Polyvinyl acetate | 1.80 | 2.0 |
| "Santolite MHP" (Aryl Sulfonamide Formaldehyde Resin) | 3.60 | 4.1 |
| Ethyl alcohol/ethyl acetate (1:1) | 12.20 | |
|  | 100.00 | 100.0 |

*Top coat*

|  | Wet Basis, Percent by Weight | Dry Basis, Percent by Weight |
|---|---|---|
| Polyvinyl chloride | 43.80 | 45.8 |
| Tricresyl phosphate | 16.60 | 17.3 |
| Polyalpha methylstyrene | 12.60 | 13.2 |
| Pigment | 18.20 | 19.0 |
| "Santolite MHP" (Aryl Sulfonamide Formaldehyde Resin) | 4.50 | 4.7 |
| Ethyl alcohol/ethyl acetate (1:1) | 4.30 | |
|  | 100.00 | 100.0 |

The coated fabrics produced in accordance with Examples I and II were blanked by subjecting a limited area to pressure by means of a hot smooth plate to flatten the embossed surface. The blanked area was then printed with a conventional drying oil printing ink employed for printing books. The ink dried by oxidation of the oil vehicle in about 8 hours (or overnight) without forced drying. The dried ink was firmly anchored to the coated surface and could not be removed when scraped with the fingernail.

The above described coated fabrics (Examples I and II) were tested for various properties to determine their usefulness as a bookbinding material and the following results were obtained:

|  | Example I | Example II |
|---|---|---|
| Total Weight (oz./sq. yd.) | 7.6 | 7.0. |
| Coating Weight (oz./sq. yd.) | 3.8 | 3.2. |
| Fabric Weight (oz./sq. yd.) | 3.8 | 3.8. |
| Mechanical Scrub Test—no. of strokes before failure (cracking) is encountered | 3,000 | 5,500. |
| Schiltknecht Flex | 11,500 | 32,000. |
| End Sheet Adhesion (Sized Turn-ins) | O. K. | O. K. |
| Sticking to Cellulose Nitrate Coated Fabric (Coating to Coating): |  |  |
| After 1 mo. at 150° F | None | None. |
| After 1 mo. at room temperature | do | Do. |
| Ink Printing-Anchorage: |  |  |
| Initial | Good | Good. |
| After 1 mo. at 150° F | No change | No change. |
| After 1 mo. at room temperature | do | Do. |
| Gold Stamping Anchorage: |  |  |
| Initial | Good | Good. |
| After 1 mo. at 150° F | No change | No change. |
| After 1 mo. at room temperature | do | Do. |
| Blanking | Good | Good. |

A suitable testing apparatus for carrying out the mechanical scrub test is described in "Rubber Age," 61, No. 2, p. 232, May (1947). The apparatus employed for the Schiltknecht flex test is described in Bulletin #105 of Alfred Sutter, 200 Fifth Avenue, New York, N. Y.

"Santolite MHP" is identified by its manufacturer, Monsanto Chemical Company, as a condensation product of an aryl sulfonamide and formaldehyde.

The polyalpha methylstyrene is a viscous liquid which is available on the open market from the Dow Chemical Company under the trade name of "Dow Resin 276-V2."

The presence of small quantities of "Santolite MHP" in the compositions of Example II has little or no effect on ink printing properties of the coated fabric. It gave added surface lustre and had no adverse effect on aging properties. In addition, "Santolite MHP" improved flexing properties of the coated fabric.

The ratio of polyvinyl chloride to the plasticizer blend in both the base and top coats of the preferred examples is 60 to 40. This ratio is preferred for the optimum pliability and processability of the plastisol composition but may be varied over a range depending upon the particular pliability desired for the coated fabric or unsupported film. If the ratio of plasticizer blend to polyvinyl chloride is increased beyond 50 parts of the plasticizer blend to each 50 parts of the polyvinyl chloride, the coating is too soft for satisfactory bookbinding material and commercial printing inks do not firmly anchor thereto. If the plasticizer blend is reduced below 30 parts to each 70 parts of polyvinyl chloride, the coating is usually too stiff for a satisfactory bookbinding product. When the polyalpha methylstyrene represents 100% of the plasticizer in the preferred formula good ink-printing results, but the coating is of such poor quality that it cracks on a single sharp fold. When tricresyl phosphate is used as 100% of the plasticizer in the preferred formula there is some improvement in flex quality, with considerable sacrifice of adhesion of the commercial drying-oil printing inks to the coating. Further, when tricresyl phosphate represents 100% of the plasticizer for the polyvinyl chloride coating, there is a greater tendency toward sticking to cellulose nitrate coatings when the two coatings are in pressure contact over a prolonged period.

It was surprising and unexpected when it was discovered that the "Santolite MHP" (an aryl sulfonamide/formaldehyde resin), a hard brittle resin, would improve the flex life of the tricresyl phosphate/polyalpha methylstyrene plasticized polyvinyl chloride coated fabric.

The preferred embodiment of this invention involves a coated fabric, adapted for use as the outer cover of paper binder boards employed in the binding of books, or any other use which requires printing on the outer surface with drying-oil printing inks. The compositions employed for fabric coatings may be dissolved in hot methyl ethyl ketone and then applied to the base fabric by means of a doctor knife. Alternately the resin may be precolloided in the plasticizer mixture by working on a two-roll rubber mill, or a Banbury mixer, in the absence of volatile solvents and while hot, calendering onto a fabric base. Also, the hot precolloided plastic mass may be sheeted in the form of an unsupported film by passing between heated calender rolls. The unsupported film is adapted for use in certain bookbinding and other applications which require printing on the surface.

The polyvinyl chloride may be replaced by a copolymer of vinyl chloride and other monomers copolymerizable therewith, such as, e. g. vinylidene chloride, vinyl acetate, dialkyl esters of fumaric, methacrylic and acrylic acids. In the case of the copolymers, the vinyl chloride represents at least 85% of the copolymer.

While the invention has been described with reference to bookbinding material, it will be understood by those skilled in the art of coated fabrics and unsupported films that the products of this invention are readily adaptable for other uses which require the surface to be printed with drying-oil type of inks.

It is apparent that many widely different embodiments of this invention may be made without departing from the spirit and scope thereof; and, therefore, it is not intended to be limited except as indicated in the appended claims.

We claim:

1. Process of preparing a coated fabric to which drying-oil printing inks will adhere, which comprises applying to at least one side of a fabric base a plastisol composition comprising uncolloided polyvinyl chloride dispersed in a blend of tricresyl phosphate and liquid polyalpha methylstyrene within the range represented by the polygon HIJKLM of the attached drawing and heating to colloid the resin.

2. A new composition of matter comprising polyvinyl chloride, tricresyl phosphate and liquid polyalpha methylstyrene in which the proportions are within the area delineated by points ABCDEFG of the attached drawing.

3. A fabric coated with the composition of claim 2.

4. An unsupported film of the composition of claim 2.

5. A new composition of matter comprising polyvinyl chloride, tricresyl phosphate and liquid polyalpha methylstyrene in which the proportions are within the area delineated by points HIJKLM of the attached drawing.

6. A bookbinding material to which drying-oil printing inks will firmly anchor, comprising a fabric base with an adherent coating of the following approximate composition:

| | Per cent by weight |
|---|---|
| Polyvinyl chloride | 27.1 |
| Tricresyl phosphate | 10.4 |
| Liquid polyalpha methylstyrene | 7.6 |
| Pigment | 51.3 |
| Polyvinyl acetate | 3.6 |
| | 100.0 | superposed over said coating a second adherent coating of the following approximate composition:

| | Per cent by weight |
|---|---|
| Polyvinyl chloride | 55.0 |
| Tricresyl phosphate | 20.9 |
| Liquid polyalpha methylstyrene | 15.8 |
| Pigment | 8.3 |
| | 100.0 |

7. A bookbinding material to which drying-oil printing inks will firmly anchor, comprising a fabric base with an adherent coating of the following approximate composition:

| | Per cent by weight |
|---|---|
| Polyvinyl chloride | 29.1 |
| Tricresyl phosphate | 11.5 |
| Liquid polyalpha methylstyrene | 8.1 |
| Pigment | 45.2 |
| Polyvinyl acetate | 2.0 |
| Aryl sulfonamide/formaldehyde resin | 4.1 |
| | 100.0 | superposed over said coating a second adherent coating of the following approximate composition:

| | Per cent by weight |
|---|---|
| Polyvinyl chloride | 45.8 |
| Tricresyl phosphate | 17.3 |
| Liquid polyalpha methylstyrene | 13.2 |
| Pigment | 19.0 |
| Aryl sulfonamide/formaldehyde resin | 4.7 |
| | 100.0 |

8. The product of claim 5 which contains an aryl sulfonamide/formaldehyde resin.

References Cited in the file of this patent

UNITED STATES PATENTS

| Number | Name | Date |
|---|---|---|
| 2,249,987 | Stanley et al. | July 22, 1941 |
| 2,568,989 | Cowell et al. | Sept. 25, 1951 |
| 2,590,834 | Faulkner et al. | Apr. 1, 1952 |
| 2,600,122 | Meyer et al. | June 10, 1952 |

FOREIGN PATENTS

| Number | Country | Date |
|---|---|---|
| 609,291 | Great Britain | Sept. 28, 1948 |